US009788114B2

(12) United States Patent
Kofman et al.

(10) Patent No.: US 9,788,114 B2
(45) Date of Patent: Oct. 10, 2017

(54) ACOUSTIC DEVICE FOR STREAMING AUDIO DATA

(71) Applicant: Bose Corporation, Framingham, MA (US)

(72) Inventors: Igor Kofman, Weston, MA (US); David Rolland Crist, Watertown, MA (US); Christopher James Mulhearn, Worcester, MA (US); Matthew Belge, Lincoln, MA (US); Michael Tiene, Franklin, MA (US); Avrum G. Mayman, Canton, MA (US)

(73) Assignee: Bose Corporation, Farmingham, MA (US)

( * ) Notice: Subject to any disclaimer, the term of this patent is extended or adjusted under 35 U.S.C. 154(b) by 0 days.

(21) Appl. No.: 14/665,367

(22) Filed: Mar. 23, 2015

(65) Prior Publication Data

US 2016/0286313 A1 Sep. 29, 2016

(51) Int. Cl.

| | |
|---|---|
| ***H04B 3/00*** | (2006.01) |
| ***H04R 3/12*** | (2006.01) |
| ***H04S 7/00*** | (2006.01) |
| *H04R 5/02* | (2006.01) |
| *H04R 5/04* | (2006.01) |

(52) U.S. Cl.

CPC ............... *H04R 3/12* (2013.01); *H04S 7/301* (2013.01); *H04R 5/02* (2013.01); *H04R 5/04* (2013.01); *H04R 2203/12* (2013.01); *H04R 2205/021* (2013.01); *H04R 2205/024* (2013.01); *H04R 2227/005* (2013.01); *H04R 2420/07* (2013.01); *H04R 2430/01* (2013.01)

(58) Field of Classification Search

CPC ...... H04R 29/001; H04R 29/002; H04R 5/00; H04R 5/02; H04R 2203/12; H04R 2201/401; H04R 2201/403; H04R 2201/405; H04R 2205/021; H04R 2205/024; H04R 2205/026; H04R 2420/07

USPC ....... 381/1, 2, 56, 58, 61, 89, 104, 300, 313

See application file for complete search history.

(56) References Cited

U.S. PATENT DOCUMENTS

| | | | |
|---|---|---|---|
| 7,299,076 | B2 | 11/2007 | Dunn, Jr. et al. |
| 8,934,647 | B2 | 1/2015 | Joyce et al. |
| 2008/0285775 | A1 | 11/2008 | Christoph et al. |

(Continued)

FOREIGN PATENT DOCUMENTS

| | | |
|---|---|---|
| GB | 2378081 | 1/2003 |

OTHER PUBLICATIONS

U.S. Appl. No. 14/665,396, filed Mar. 23, 2015, Igor Kofman.

*Primary Examiner* — William A Jerez Lora
(74) *Attorney, Agent, or Firm* — Fish & Richardson P.C.

(57) ABSTRACT

The technology described in this document can be embodied in a first acoustic device that includes an input port configured to receive an input signal representing audio from a media device, and one or more acoustic transducers. The first acoustic device also includes one or more processors configured to generate, from the input signal, a first signal for producing an acoustic output from the one or more transducers, and a second signal for producing an acoustic output from a second acoustic device. The first and second signals are generated from the input signal based on a feedback signal received from the second acoustic device. The first acoustic device also includes an output port for providing a portion of the second signal to the second acoustic device.

22 Claims, 10 Drawing Sheets

(56) References Cited

U.S. PATENT DOCUMENTS

| | | | | |
|---|---|---|---|---|
| 2009/0034750 | A1 | 2/2009 | Ayoub et al. | |
| 2010/0135501 | A1 | 6/2010 | Corbett et al. | |
| 2011/0142247 | A1 | 6/2011 | Fellers et al. | |
| 2012/0114151 | A1* | 5/2012 | Nguyen | G06K 9/0057 381/303 |
| 2013/0324031 | A1* | 12/2013 | Loureiro | H04S 7/301 455/3.06 |
| 2013/0343568 | A1* | 12/2013 | Mayman | G06F 1/1632 381/77 |
| 2014/0003622 | A1* | 1/2014 | Ikizyan | H04R 3/00 381/95 |
| 2014/0169569 | A1* | 6/2014 | Toivanen | H04R 5/04 381/17 |
| 2014/0211953 | A1 | 7/2014 | Alderson et al. | |
| 2014/0277646 | A1 | 9/2014 | Anderson et al. | |
| 2014/0294201 | A1 | 10/2014 | Johnson et al. | |
| 2014/0355806 | A1* | 12/2014 | Graff | H04R 1/025 381/334 |
| 2015/0208187 | A1* | 7/2015 | Carlsson | H04R 3/12 381/79 |
| 2015/0382128 | A1 | 12/2015 | Ridihalgh et al. | |

* cited by examiner

ACOUSTIC DEVICE FOR STREAMING AUDIO DATA

TECHNICAL FIELD

This disclosure generally relates to enhancing acoustic experience via a portable device.

BACKGROUND

Portable speakers can be used for wirelessly connecting to media playing devices and phones.

SUMMARY

In one aspect, this document features a first acoustic device that includes an input port configured to receive an input signal representing audio from a media device, and one or more acoustic transducers. The first acoustic device also includes one or more processors configured to generate, from the input signal, a first signal for producing an acoustic output from the one or more transducers, and a second signal for producing an acoustic output from a second acoustic device. The first and second signals are generated from the input signal based on a feedback signal received from the second acoustic device. The first acoustic device also includes an output port for providing a portion of the second signal to the second acoustic device.

In another aspect, this document features a method that includes receiving, at a processing device, an input signal representing audio from a media device, and receiving a feedback signal from a speaker device. The feedback signal includes information on a relative position of the speaker device with respect to the processing device. The method also includes processing the input signal based on the information from the feedback signal to generate an output signal configured to produce an acoustic output from the speaker device, and providing the output signal to the speaker device.

In another aspect, this document features a system that includes a speaker device, and a docking device that is configured to detachably engage with the speaker device. The docking device includes a charging connector configured to provide an electrical connection with a charging port of the speaker device, an input port configured to receive an input signal representing audio from a media device, and one or more transducers configured to produce acoustic output. The docking device also includes one or more processors configured to generate, from the input signal, a first signal for producing an acoustic output from the one or more transducers, and a second signal for producing an acoustic output from the speaker device. The docking device further includes an output connector for providing the second signal to the speaker device.

Implementations can include one or more of the following features.

The second acoustic device can be a speaker device. The first acoustic device can include a receptacle for detachably engaging at least a portion of the second acoustic device. The receptacle can include a charging port for charging a battery of the second acoustic device. The media device can be a television. The input port can include a receptacle for detachably engaging a wire from the media device. The input port can be configured to receive a wireless signal as the input signal. The first acoustic device can include multiple transducers. The first signal can be configured to produce acoustic outputs from the multiple transducers. The second signal can be configured to produce acoustic outputs from multiple speaker devices. The acoustic output from one of the multiple speaker devices can be different from the acoustic output from another of the multiple speaker devices. The first acoustic device of claim 1, wherein the output port comprises a transmitter for transmitting the second signal to the second acoustic device. The transmitter can be configured to transmit the second signal in accordance with a Bluetooth® standard. The feedback signal can include information on a relative position of the second acoustic device with respect to the first acoustic device. The one or more processors can be configured to use beamforming techniques in generating the first and second signals. The feedback signal can include information on a user preference associated with an acoustic output of the speaker device. The output signal can be generated also based on the user preference. The user preference can indicate an acoustic intelligibility of the user.

Various implementations described herein may provide one or more of the following advantages. By providing an acoustically enabled dock, the speakers in the dock can be used to supplement, improve, or even substitute the acoustic output from the portable speaker. Feedback from remote speakers can be used at the dock for intelligent sound processing that enhances the quality of the acoustic output. For example, dialog intelligibility can be enhanced based on the feedback to eliminate undesirable effects of the environment or speaker placement, and deliver clear, intelligible dialogs to remote speakers at a comfortable volume. The technology described herein can also be used for creating personalized sound zones by emphasizing local dialog reproduction and smoothing dynamic volume peaks, thereby allowing for quieter listening levels that do not disturb others. Concurrent consumption of different audio content can also be facilitated. For example, the dock can be configured to be provide acoustic output from one media device to a remote speaker while concurrently providing television (TV) sound to a headphone. By using low latency codecs (e.g., aptX Low Latency codec) in the wireless connections, synchronization between images and sounds of audio-visual media can be improved, thereby allowing the portable speakers to be used for viewing TV or consuming other audio-visual media. Intelligent sound processing capabilities on the dock can be used for augmenting an existing acoustic profile (e.g., sound from a TV set in a given room) to provide an improved acoustic experience without the need for more expensive home theater equipment.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

This document describes technology that allows portable wireless speakers to be used in conjunction with an audio-visual (AV) device such as a TV or a projector. The technology can be embodied in acoustic devices that supplement, improve, or substitute the acoustic experience provided by an AV device. An example of such an acoustic device includes a dock for a portable speaker, wherein the dock itself includes one or more speakers, as well as signal processing circuitry capable of providing control signals for the portable speaker such that the portable speaker and the dock speakers together deliver a tailored acoustic experience.

Portable battery-operated wireless speakers can be used for delivering near-field acoustic experiences. For example, a portable speaker can be paired with a media device such as a CD player or smartphone such that the portable speaker delivers acoustic signals based on signals wirelessly communicated to the portable speaker from the media device. Wireless technology such as Bluetooth® can be used for pairing the portable speaker to the media device. Such connections introduce a latency, which is represented as a difference between the time when an audio signal is generated at the media device and the time the acoustic output is generated from the portable speaker. For audio-only content such as music or phone conversations, relatively high latency (e.g., 100-400 ms) may be acceptable because the acoustic output is not synchronized with any other signal. However, in case of AV content, the audio content is synchronized with a visual signal such as a video or image, and a high latency can result in an undesirable lag between the components of the AV content.

This document describes acoustic devices that can communicate with one or more other speakers (e.g., portable speakers) using low latency communication protocols that support acceptable latency. In addition, the acoustic devices are configured to include processing circuitry and acoustic transducers (i.e., speakers) that facilitate delivery of tailored acoustic experiences to one or more users. The acoustic experiences can be modified or personalized based on, for example, feedback from one or more speakers communicating with the acoustic device.

Figure 1A:
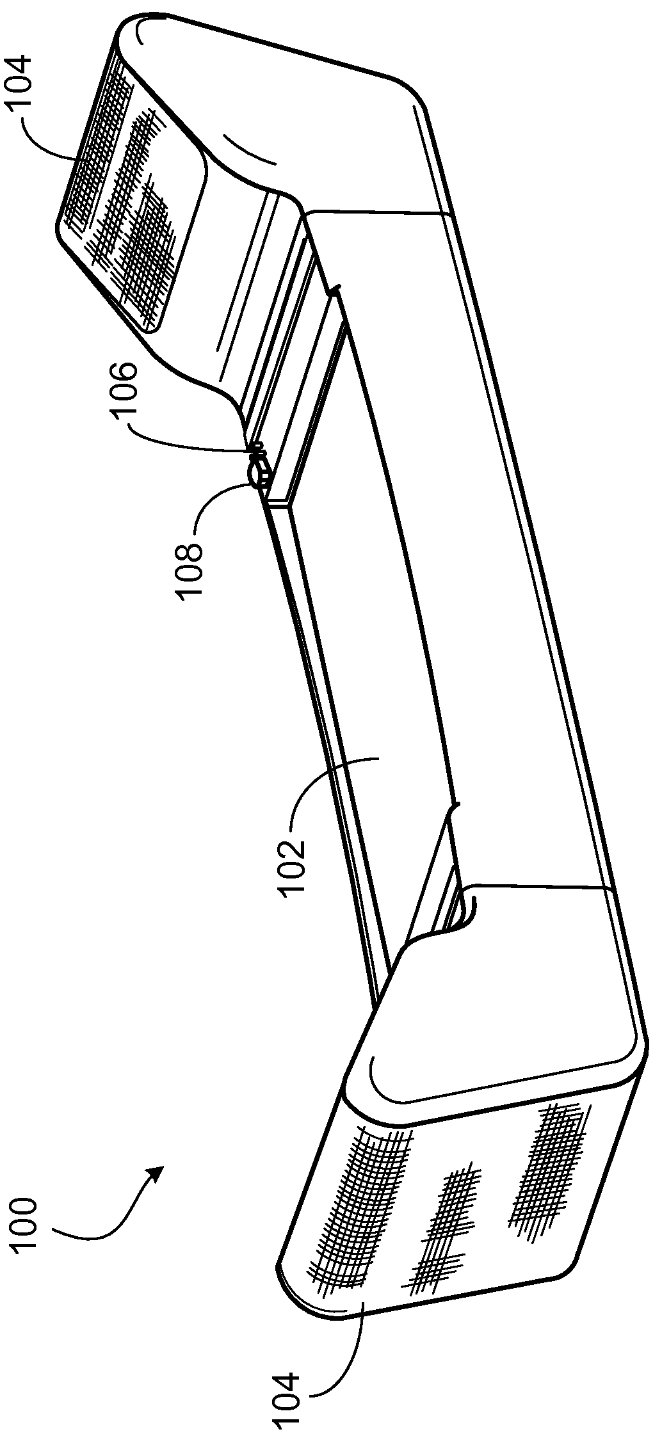
FIG. 1A is a diagram showing an example of an acoustic device that is used as a dock for a portable speaker.

FIG. 1A shows an example of an acoustic device 100 that can be used as a dock for a portable speaker. In some implementations, the acoustic device 100 is configured to be connected to an AV device such as a TV, for example, via a High Definition Multimedia Interface (HDMI) connection. In this document, the phrase "acoustic device" is sometimes used interchangeably with the word "dock." However, other types and forms of acoustic devices are also within the scope of this disclosure. Other examples of acoustic devices includes a dongle, or a stand-alone sound processing device capable of wirelessly communicating with one or more speaker devices. The form factor of the acoustic device 100 can be configured based on functionalities of the device. For example, when implemented as a dock for a portable speaker, the form factor of the acoustic device 100 is configured in accordance with the form factor of the portable speaker. In some implementations, the form factor of the acoustic device can be configured such that the acoustic device does not appear unduly obtrusive when placed near a corresponding AV device such as a TV.

Figure 1B:
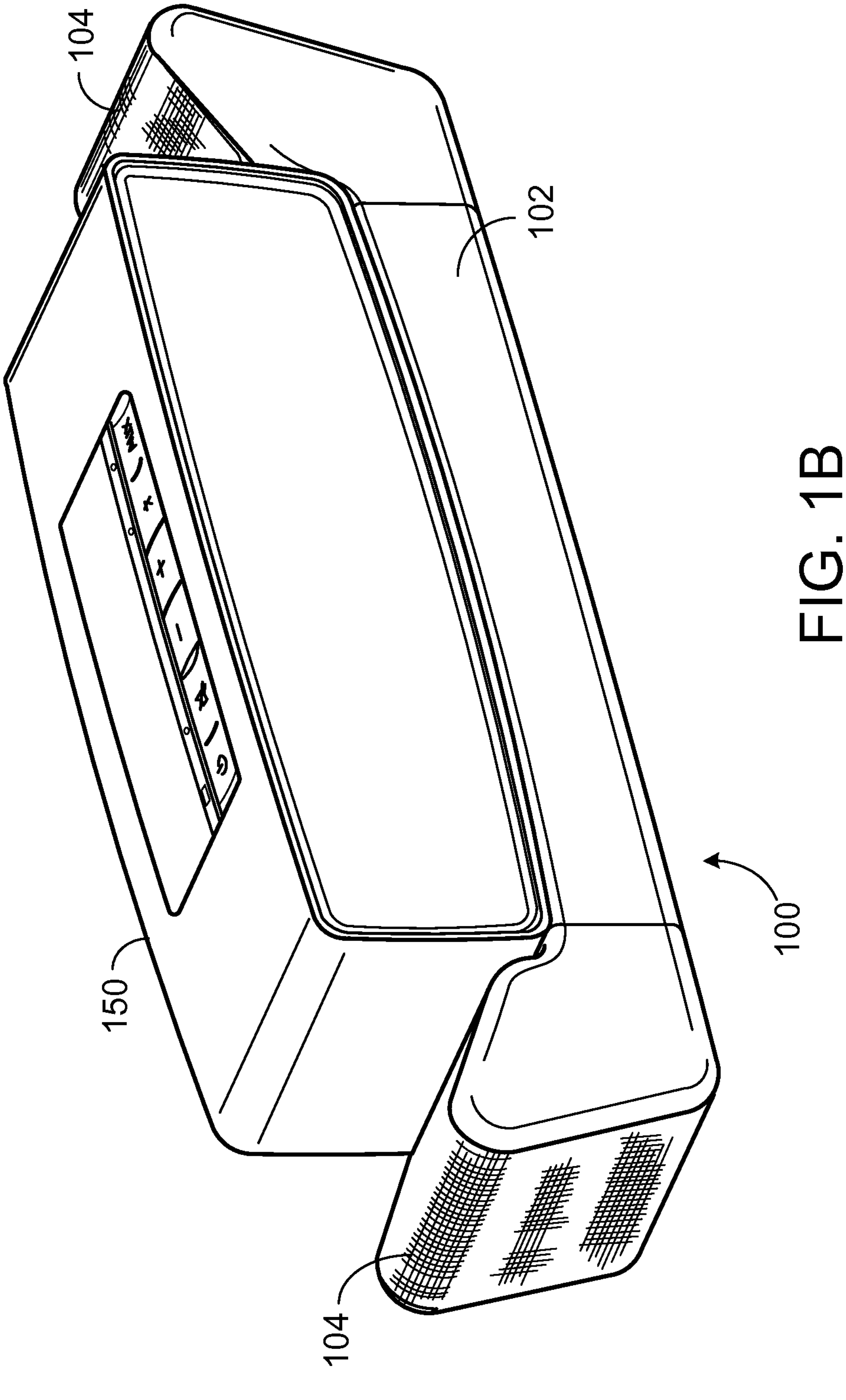
FIG. 1B is a diagram showing a portable speaker attached to the acoustic device of FIG. 1A.

In some implementations, the acoustic device 100 includes a housing 102 for enclosing sound processing circuitry of the acoustic device. For example, the housing 102 can include one or more of: a digital signal processor (DSP), a general purpose processor, memory, input/output ports and a transceiver. On the external side, the housing 102 can include, for example, a receptacle for receiving at least a portion of a portable speaker. FIG. 1B shows a portable speaker 150 attached to the acoustic device 100. To facilitate receiving the portable speaker 150, the housing 102 can include an attachment mechanism 108 configured to couple with a corresponding receptacle in the portable speaker 150 in a mating configuration. In some implementations, the housing 102 can also include electrical terminals 106 that facilitate an electrical connection with corresponding ports of the portable speaker 150. The electrical connections can be used, for example, to provide control signals from the acoustic device 100 to the portable speaker 150. In some implementations, the electrical terminals 106 can include a charging port configured to provide a charging current from the acoustic device 100 to the portable speaker 150.

Figure 1C:
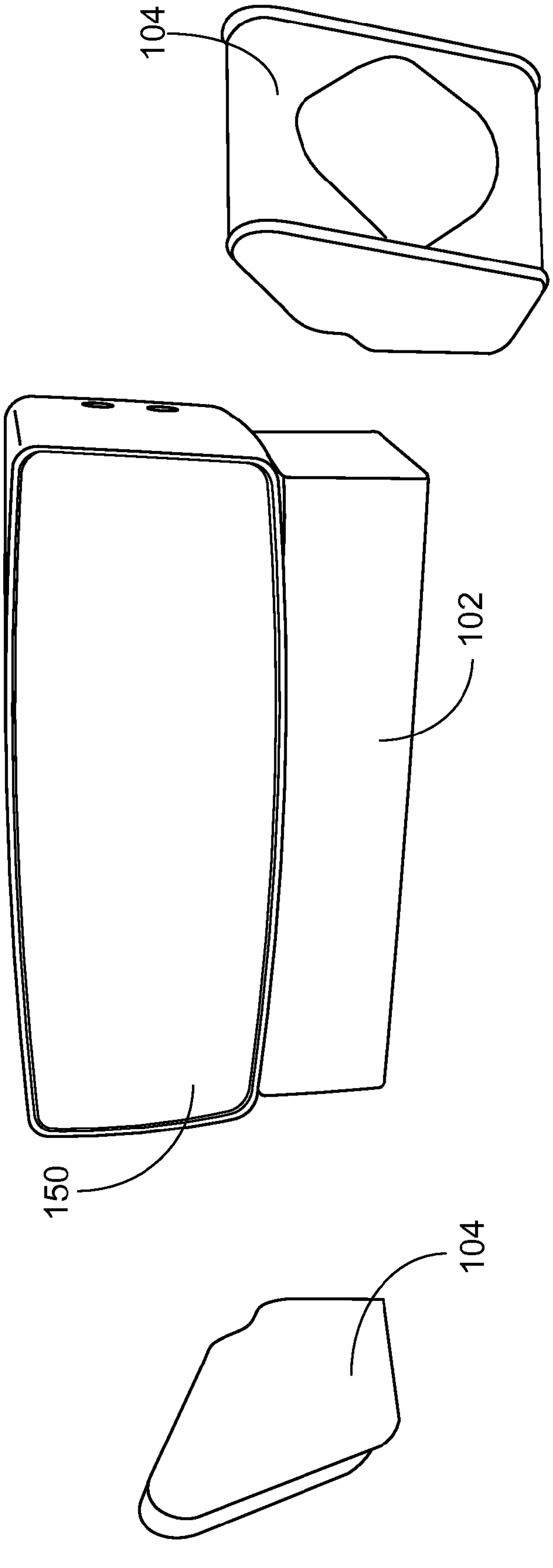
FIG. 1C shows another example implementation of the acoustic device with detachable speakers.

In some implementations, the acoustic device 100 includes one or more speakers 104. The speakers 104 can be configured to be detachable from the housing 102. An example of such a configuration is shown in FIG. 1C. In such cases, the speakers 104 can include a transceiver (e.g., a Bluetooth® communication module) that facilitates a wireless communication with the housing 102. The speakers 104 include a speaker-housing and one or more acoustic transducers disposed within the speaker housing. The one or more acoustic transducers can be configured to be controlled using the processing circuitry of the housing 102.

The speakers 104 can be configured based on the functionalities desired for the acoustic device 100. In some implementations, the speakers 104 can include acoustic waveguides for configuring the radiation pattern of acoustic energy emanating from the speakers 104. This can be used, for example, to create an immersive theater-like acoustic experience from low power acoustic transducers. In some implementations, the acoustic transducers of the speakers 104 can be configured based on capabilities of the portable speaker 150. For example, the frequency characteristics of the acoustic transducers can be configured to supplement frequency characteristics of the portable speaker. In such cases, if particular frequency ranges are not well reproduced by the portable speaker, the acoustic transducers of the speakers 104 can be configured to compensate in those particular frequency ranges. In some implementations, the speakers 104 can be configured to support acoustic beam-forming that facilitates the speakers 104 to radiate acoustic energy in various directions, depending, for example, on control signals received from processing circuitry of the housing 102.

In some implementations, the acoustic device 100 can be connected to one or more additional speakers. For example, the acoustic device 100 can be configured to stream audio signal to one or more wireless headsets. In some implementations, additional speakers can be connected, via wired or wireless connections, to the acoustic device 100. For example, additional portable speakers similar to the portable speaker 150 may be connected to, and controlled by, the acoustic device 100.

In some implementations, the acoustic device 100 includes an input port configured to receive an input signal that represents audio from a separate media device. In some implementations, the input port is configured to receive a hardwired connection such as an HDMI connection. In such cases, the input port includes a receptacle for engaging a wire that connects the acoustic device with the media device. In some implementations, the input port includes a wireless receiver module (e.g., a Bluetooth® or Wi-Fi module) configured to receive the input signal from the media device wirelessly. For example, if a TV is equipped with a low latency Bluetooth® transceiver, the acoustic device can be paired to such a TV for receiving the input signal wirelessly. In some implementations, the media device is an AV device such as a TV. Other examples of a media device include a compact disk (CD) player, a digital video disk (DVD) player, a Blu Ray disk (BD) player, a smartphone, a tablet computer, an e-reader, a laptop computer, a desktop computer, a satellite radio receiver, an internet streaming device, a gaming device, or another device that generates an output signal for producing an acoustic output. In some implementations, the media device is a device that acts as a hub for multiple other media devices. For example, the media device can be a home theater receiver to which multiple other devices such as CD players, BD players, DVD players, gaming devices, etc. are connected.

The processing circuitry within the acoustic device 100 includes one or more processing devices such as a DSP or a general purpose processor for producing one or more signals that are provided to the various speakers associated with the acoustic device 100. The various speakers include the portable speaker 150 and the speakers 104. In some implementations, the various speakers can also include additional wired or wireless speakers connected to the acoustic device 100.

The acoustic device 100 is configured to communicate with remote wireless speakers via low latency protocols that support acceptable latency. In some implementations, the latency can be configured to be in the range 32-50 ms (40 ms in particular cases) by using a low latency audio codec such as aptX Low Latency (aptX-LL) (developed by CSR plc of Cambridge, UK) over a Bluetooth® connection. The aptX-LL codec is typically used in video and gaming applications, but can be repurposed for use by the acoustic device 100 to transmit stereo audio signal over short-range radio to the one or more speakers. In some implementations, a speaker receiving the stereo audio signal communicates in accordance with the Bluetooth® Advanced Audio Distribution Profile (A2DP) standard.

The A2DP standard defines how multimedia audio can be streamed from one device to another over a Bluetooth® connection. For example, music can be streamed from a mobile phone, to a wireless headset, hearing aid/cochlear implant streamer, car audio, or from a laptop/desktop to a wireless headset. In some implementations, the A2DP standard can be used for streaming audio (e.g., as two-channel stereo data) from the acoustic device 100 over a Bluetooth® connection to a wireless headset or a portable speaker 150. The A2DP standard supports various audio codecs, including, for example, sub-band coding (SBC) codec, voice-signal codecs corresponding to Bluetooth®, such as Continuously Variable Slope Delta Modulation (CVSDM), MPEG-1, MPEG-2, MPEG-4, Advanced Audio Coding (AAC), and Adaptive Transform Acoustic Coding (ATRAC). In some implementations, the A2DP standard can be extended to support aptX codecs such as aptX-LL.

The processing circuitry of the acoustic device 100 processes the input signal from the media device to generate the one or more signals that are provided to the various speakers. The one or more signals that are provided to the speakers can be different from one another. For example, the processing circuitry may process the input signal to generate a first signal for producing an acoustic output from one of the speakers 104, and a second signal for producing an acoustic output from the portable speaker 150. Continuing with the same example, the processing circuitry may generate a third signal for another of the speakers 104. In some implementations, the first and third signal may be different from one another.

In some implementations, acoustic beamforming techniques can be used for generating the signals for the different speakers. This can be done, for example, to create directional acoustic outputs configured to create an immersive theater-like acoustic experience. In general, beamforming or spatial filtering is a signal processing technique used for directional signal transmission. See commonly owned U.S. Pat. No. 7,299,076, the entire contents of which are incorporated herein by reference. The acoustic device 100 can be configured to achieve acoustic beamforming using the one or more speakers associated with the acoustic device 100 as a phased array such that acoustic signals radiated from the speakers at particular angles experience constructive interference while others experience destructive interference. See commonly owned U.S. Pat. No. 8,934,647, the entire contents of which are incorporated herein by reference. To change the directionality of radiation of a particular speaker, the processing circuitry of the acoustic device 100 can be configured to control the phase and relative amplitude of the acoustic signal at the various speakers, in order to create a pattern of constructive and destructive interference in the acoustic wavefront. In some implementations, acoustic beamforming is achieved using only hardwired speakers (e.g., the speakers 104 together with the portable speaker 150 docked on the acoustic device 100). However, in other implementations, where the latency of a corresponding wireless connection is at least approximately deterministic, wireless speakers can be used with or without hardwired speakers in acoustic beamforming.

In some implementations, the processing circuitry may generate a signal for producing an acoustic output from a particular speaker based on a feedback signal. The feedback signal may be received from the particular speaker for which the signal is generated, or from a different device such as another speaker or recording device. For example, the processing circuitry may generate a signal for the portable speaker 150 based on a feedback signal from the portable speaker 150 indicating a distance of the portable speaker from the acoustic device 100. This can be done, for example, by accessing a pre-compiled Bluetooth® power table that stores values of transmitted power as a function of the power of the received feedback signal. The power table can be stored, for example, as a part of the Bluetooth® firmware (either in the portable speaker or the acoustic device 100) and can be used for determining a distance of a Bluetooth® transmitter based on the power of a received Bluetooth® signal. In some implementations, the distance between the portable speaker and the acoustic device 100 can also be determined using a pair of infra-red (IR) diode and receiver. For example, an IR diode and receiver can be installed on the acoustic device 100 and the portable speaker, respectively (or vice-versa). For such an implementation, the diode can be caused to emit IR radiation at a specific modulation rate, and the corresponding signal received at the receiver (e.g., an integrated detector notch filter) can be analyzed to determine the distance between the IR diode and receiver. The distance information in the feedback signal can be used, for example, to balance the total acoustic output from the portable speaker 150 and the speakers 104.

In some implementations, an audio signal emanating from a speaker 104 can be recorded using a recording device such as a microphone disposed on the portable speaker 150. Information representing the recorded signal can then be transmitted to the acoustic device 100 as a feedback signal. The recorded audio can then be correlated with the corresponding signal that produced the original acoustic output from the speaker 104 to determine acoustic characteristics of the recorded audio. Based on the determined acoustic characteristics, the processing circuitry can be configured to determine new filter coefficients for adaptive filters disposed in the speaker 104 and/or the portable speaker 150 such that the new filter coefficients cause the speakers to together produce a target acoustic output. The acoustic outputs from the one or more speakers are then adjusted based on the corresponding new filter coefficients, for example, by transitioning corresponding audio streams (e.g., by cross-fading or other transition technique) from the old coefficients to the new coefficients.

In another example, if the distance is greater than a threshold, the processing circuit may determine that the portable speaker 150 has been taken outside a normal hearing range, and accordingly adjust the signals for the speakers 104 such that the speakers 104 independently provide the acoustic output of the media device. This can happen, for example, if multiple users are watching a game on TV, and a particular user carries away the portable speaker to another room. In such a case, the processing circuitry can be configured to provide independent audio outputs to the portable speaker 150 and the speakers 104 such that no one misses the game audio. In some implementations, the processing circuitry can include a digital delay that adjusts a latency between the speakers 104 and the portable speaker 150 based on the relative distance between the different speakers.

In some implementations, upon detecting unavailability of the portable speaker 150, the acoustic device may send a control signal to the corresponding media device (e.g., a TV) such that the audio output switches to the native speakers of the media device. For example, if the acoustic device detects an unpairing of the portable speaker 150 from the acoustic device 100, for a duration longer than a threshold, the acoustic device 100 may relinquish control of the acoustic output to the native speakers of the media device.

The feedback signal can be provided to the acoustic device 100 by the speakers in various ways. In some implementations, where a Bluetooth® connection is used for audio transmission between the acoustic device 100 and a speaker, a feedback channel (also referred to as a "back channel") associated with the connection can be used for transmitting the feedback signal from the speaker to acoustic device 100. In some implementations, the information transmitted back to the acoustic device over the back channel can be encoded using a low complexity codec such as SBC.

Figure 2A:
FIG. 2A illustrates a use of the acoustic device to stream TV audio to a headset.

The combination of the acoustic device 100 and the one or more connected speakers can be used in implementing various types of acoustic environments. In some implementations, the acoustic device 100 can be used in conjunction with a wirelessly connected headset to facilitate private listening. This scenario is illustrated by an example in FIG. 2A. The wireless headset 205 can be connected to the acoustic device 100, for example, using a low-latency connection such as one facilitated by an aptX codec over a Bluetooth® connection. In some implementations, the acoustic device 100, when equipped with one or more local speakers 104, can be configured to switch off the speakers 104 upon detecting the presence of the wireless headset 205. Such private listening capability allows a user to use an AV device without disturbing another person.

Figure 2B:
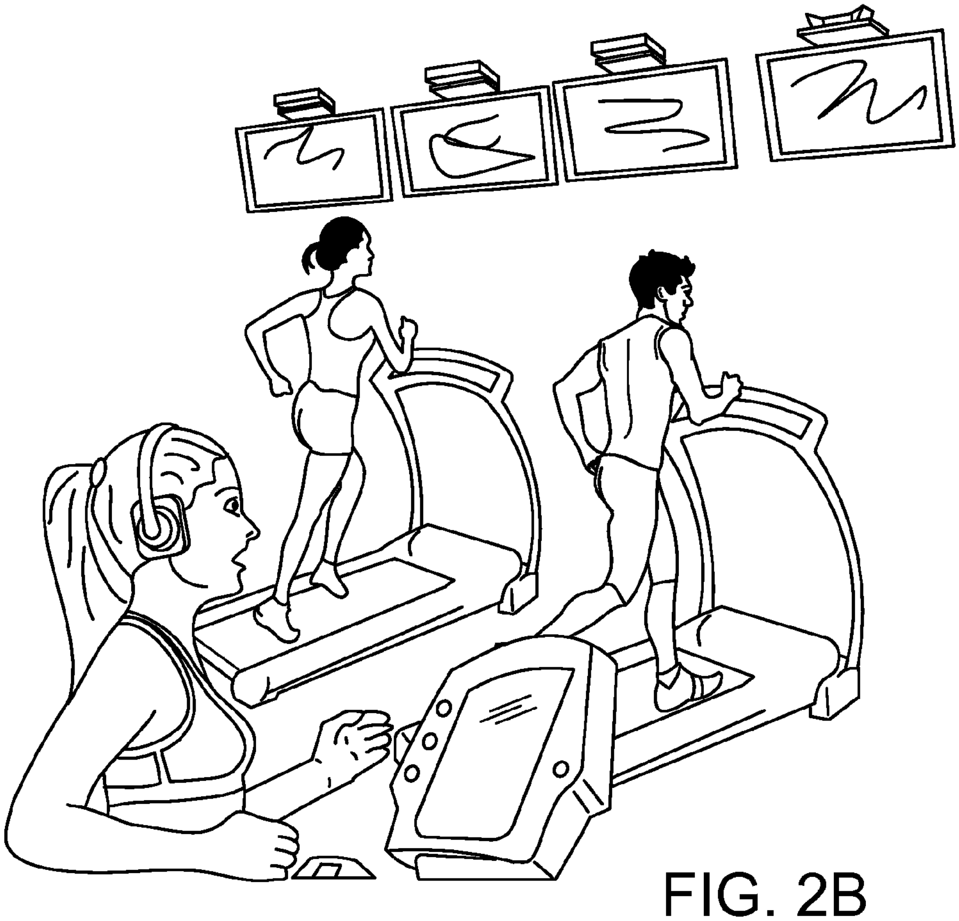
FIG. 2B illustrates an example of an environment where different users concurrently listen to different acoustic outputs.

In some implementations, the acoustic device can also be configured to facilitate concurrent consumption of different audio content. For example, the acoustic device may include multiple transceiver modules for communicating with different speakers and/or headsets. In such cases, a first transceiver may stream TV sound to a wireless headset while another plays music from a different device through the speakers 104 and/or the portable speaker 150. In some implementations, the acoustic device 100 can be configured to stream different audio to multiple headsets. This is illustrated in the example situation depicted in FIG. 2B where multiple individuals at a gym are using headsets to listen to audio from multiple TV sets. In such cases, the acoustic device 100 includes multiple input ports for receiving multiple input signals from different devices. For instance, in the example of FIG. 2B, the multiple TV sets can be connected to multiple input ports of an acoustic device 100. As an alternative, a smaller subset of TVs (e.g., one, two or three TVs) can be connected to a particular acoustic device 100, and multiple acoustic devices may be used in the gym. In some implementations, input signal from a same device can be processed to stream different audio content to different devices. For example, in case of split-screen gaming or split screen TV viewing, the acoustic device 100 can be configured to process the input signal from a same device (in this example, a gaming device and a TV, respectively) to stream corresponding audio content to different speakers or headsets.

Figure 2C:
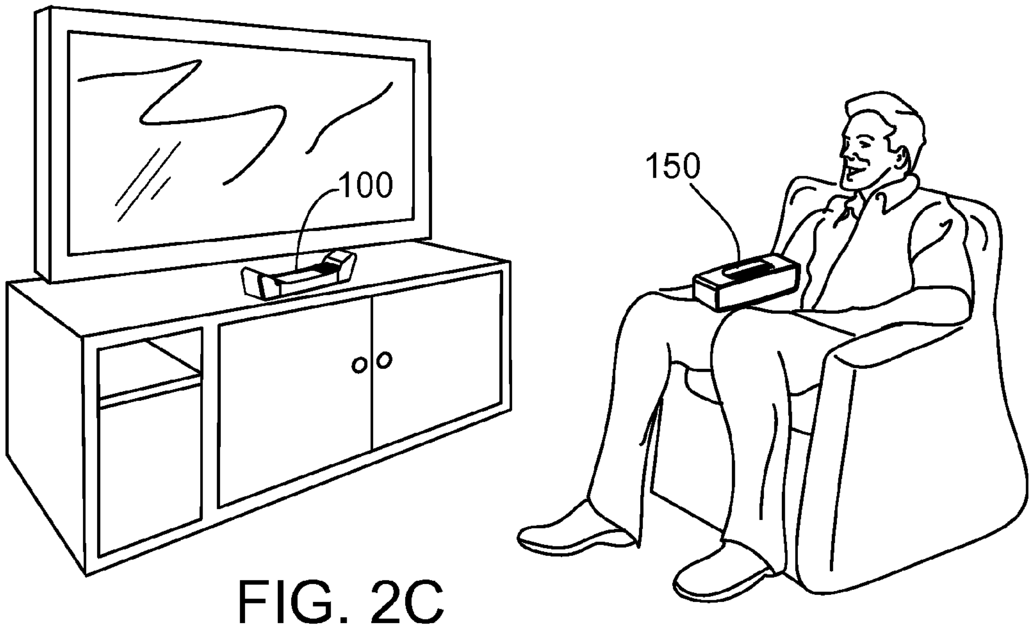
FIG. 2C illustrates an example of a personal sound zone created by the acoustic device via the use of a portable speaker.

In some implementations, the portable speaker 150 can be detached from the acoustic device 100 for use as a personal acoustic device. This is illustrated in the example situation depicted in FIG. 2C, where the acoustic device 100 streams TV audio to the portable speaker 150. In some implementations, the acoustic device 100 can process the TV audio prior to transmitting the audio to the portable speaker 150. For example, audio from the TV can be boosted by the acoustic device 100 over the entire spectrum of the audio (for example, by introducing a gain over the entire spectrum) before providing the audio stream to the portable speaker.

In some implementations, the acoustic device 100 can be configured to provide personalized sound zones via a portable speaker 150 or a wireless headset. In such cases, the acoustic device 100 can be configured to introduce specific, and possibly user-defined or user-selectable, sound processing before transmitting the audio from the TV to the portable speaker 150. In one example, the acoustic device can be configured to introduce personalized gain control to the TV audio. In another example, the acoustic device 100 can be configured to enhance dialog or speech intelligibility of the TV audio by extracting and boosting dialog components of the TV audio signal. The dialog component can be extracted by the acoustic device 100, for example, by extracting the signal from a predefined dialog channel (e.g., the center channel in 5.1 surround sound), or using another technique for detecting and extracting speech from mixed audio.

Figure 3:
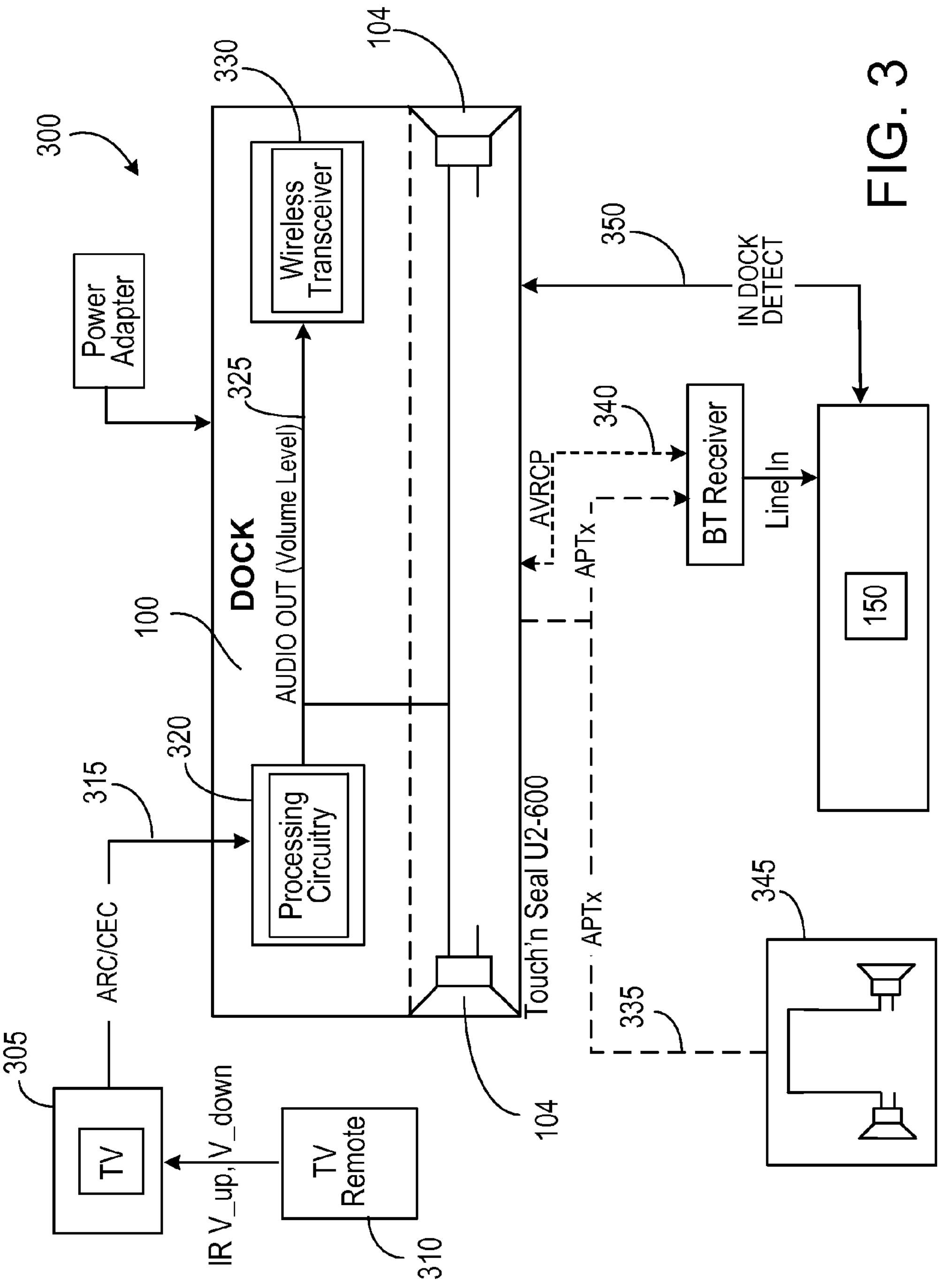
FIG. 3 shows a block diagram of a system for controlling an acoustic device using another device such as a TV remote.

In some implementations, the acoustic device 100 can be configured to control acoustic output of one or more speakers paired to the acoustic device based on control information provided by the media device to which the acoustic device is connected. For example, if a user uses a TV remote to turn up or turn down the volume, the acoustic device 100 can be configured to receive a corresponding control information from the TV, and initiate transmission of control signals to the one or more connected speakers accordingly. FIG. 3 depicts a system 300 for controlling an acoustic device 100 using another device such as a TV 305. In the system 300, a user may use a TV remote 310 to send control instructions to the TV 305, which in turn provides a corresponding control signal to the acoustic device 100 via the connection 315.

In some implementations, the connection 315 includes an HDMI cable that includes an audio return channel (ARC) configured to transmit audio data from the TV to the acoustic device 100. The HDMI cable can include a connection referred to as consumer electronics control (CEC), which allows the user to command and control the acoustic device 100 through the HDMI cable using the TV remote 310. Remote controllers of other devices connected to the acoustic device 100 can also be used for the same purpose. The CEC can include a one-wire bidirectional serial bus that is based on the standard AV.link protocol developed by European Committee for Electrotechnical Standardization (CENELEC) to perform remote control functions.

The CEC can be used, for example, to convey the command data received at the TV 305 from the TV remote 310 to the acoustic device 100. In some implementations, the processing circuitry 320 of the acoustic device 100 can be configured to process the information received via the CEC to adjust the output signal 325 provided to the speakers 104 and/or the wireless transceiver module 330. In some implementations, where the processing circuitry 320 is incapable of directing processing a CEC signal, an appropriate converter module such as a CEC extractor can be used to convert the CEC signal to a signal that the processing circuitry 320 is capable of processing. In such cases, the converter interfaces between the TV 305 and the processing circuitry 320 to fetch volume data provided over a CEC connector from the TV. For example, in implementations that uses the Analog Devices 21369 DSP, a CEC to RS-232 converter can be used for converting the CEC signal to RS-232, which then is forwarded to a universal asynchronous receiver/transmitter (UART) of the 21369 DSP. In some implementations, this can require modification of the UART firmware to interpret the data received from the CEO to RS-232 converter.

In operation, the volume control or other control data received over the connection 315 is forwarded to the processing circuitry 320, which also receives audio data from the TV 305, for example, via one or more other pins of the HDMI connection. The control data received over the CEO connection (or from the CEO converter) is then processed and applied by the processing circuitry 320 to the audio data to determine the system volume. In some implementations, the control data received over the CEO connection (or from the CEO converter) is represented as integers, and may need to be scaled to floating point values to make the digital control signal compatible with the data format of the processing circuitry. The system volume data is then included in the output signal 325 provided to the one or more speakers connected to the acoustic device 100. The output signal can be provided to the one or more speakers via a wired connection or wirelessly. For example, the output signal 325 can be provided to the speakers 104 over a wired connection, and to one or more wireless speakers 345 (e.g., a wireless speaker or a wireless headset) over a wireless connection 335 such as one that uses aptX over a Bluetooth® connection. In some implementations, a control signal based on the control data received over the CEO connection can be forwarded to a wireless device over a separate wireless connection 340 such as the Audio/Video Remote Control Profile (AVRCP) used for controlling Bluetooth® audio. In some implementations, upon detecting that the portable speaker 150 is docked on the acoustic device 100, the output signal 325 can be provided to the portable speaker over a wired connection 350 using, for example, an electrical terminal 106 described above with reference to FIG. 1A.

Figure 4:
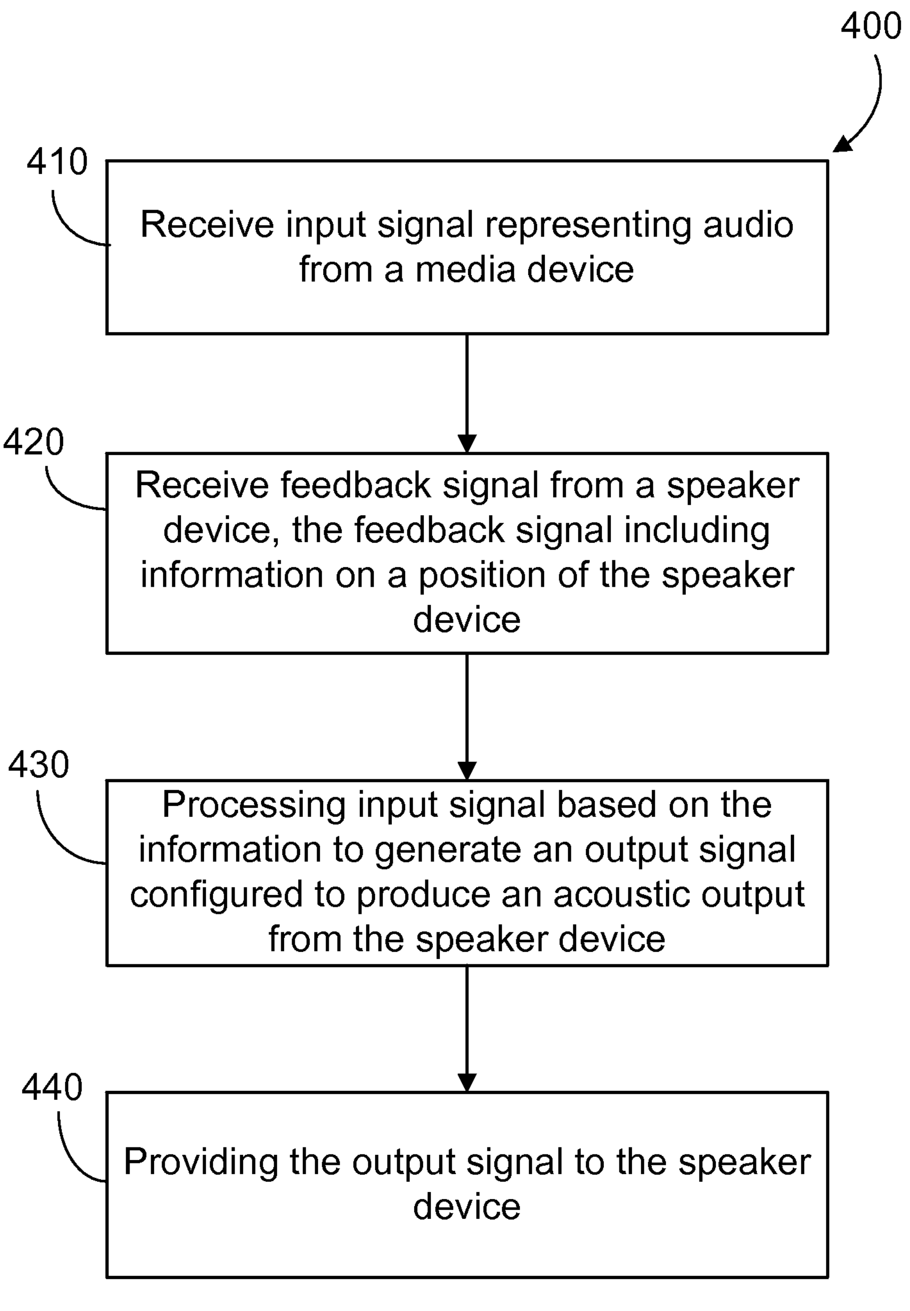
FIG. 4 is a flowchart of an example process for controlling a speaker device based on a feedback signal.

In the various examples described above, the acoustic device 100 controls acoustic output via one or more wired or wireless speakers, possibly based on feedback signals received from the one or more speakers. FIG. 4 describes a flowchart of an example process 400 for controlling a speaker device based on a feedback signal from the speaker. In some implementations, at least a portion of the process 400 may be performed by the acoustic device 100, for example, by the processing circuitry 320. Operations of the process 400 includes receiving an input signal representing audio from a media device (410). The media device can be an AV device such as a TV. In some implementations, the media device can be a CD player, a DVD player, a BD player, a set-top box, a desktop or laptop computer, a tablet, an e-reader, or an internet streaming device. The audio from the media device can be received, for example, via a wired connection such as an HDMI connection. In some implementations, the audio from the media device may be received over a wireless connection such as a Bluetooth® connection.

The operations can further include receiving a feedback signal from a speaker device (420). The feedback signal can include information on a relative position of the speaker device with respect to the device that performs operations of the process 400. For example, the feedback signal can indicate an acoustic profile at the speaker device. The acoustic profile can represent overall acoustic characteristics of the sound output from one or more speakers associated with the acoustic device, and can be measured, for example, using a microphone disposed on the speaker device. In some implementations, the speaker device is a portable speaker, for example, the portable speaker 150 described above. The feedback signal can be substantially similar to the feedback signal described above with reference to FIGS. 1A-1C.

In some implementations, the feedback signal can include information on user preference associated with an acoustic output of the speaker device. For example, the speaker device (e.g., the portable speaker 150) can include one or more controls that allow a user to change the volume or other characteristics of the acoustic output, and such user input is included as the information on user preference. In some implementations, the user input can include a selection of a preferred acoustic mode. For example, a user may want to use the speaker device to improve speech intelligibility, and therefore selects a speech mode accordingly. Such user selection can also be included as the information on user preference.

The operations further include processing the input signal based on the information in the feedback signal to generate an output signal configured to produce an acoustic output from the speaker device (430). For example, the information in the feedback signal may be processed to determine characteristics of an acoustic profile at the speaker device, and the characteristics can be used in processing the input signal such that a target acoustic profile is obtained. In some implementations, the input signal can be processed based on user preferences indicated by the feedback signal. For example, if the feedback signal indicates a user preference of improving speech intelligibility, the input signal can be processed to extract and amplify speech within the input signal.

The operations further include providing the output signal to the speaker device (440). The output signal can be provided to the speaker device in various ways. In some implementations, the output signal is provided to the speaker device over a wired connection. In some implementations, the output signal is provided to the speaker device over a wireless connection such as a Bluetooth® or Wi-Fi connection. In some implementations, the output signal is converted to a data stream using a low latency codec such as aptX-LL and transmitted by a Bluetooth® transmitter wirelessly to a paired speaker or headset.

While in some implementations, the acoustic device 100 and the speakers associated with the acoustic device 100 are used in substituting the speakers of the original media device such as a TV, the acoustic device can also be used in augmenting or improving the sound from the speakers of the original media device. For instance, the speakers of some TV sets may produce acceptable sound, which may however lack certain acoustic characteristics For example, the speakers of a particular TV set may produce a rich bass, yet be deficient in producing adequately clear speech. In another example, the speakers of a TV may not be capable of producing an immersive theater-like sound. In such cases, and others, the acoustic device 100 can be used, possibly in conjunction with one or more associated additional speakers, to augment the sound from the TV speakers. The acoustic device 100 and the associated speakers therefore can be configured to work in cooperation with the TV speakers to produce target acoustic distribution that may not be produced using the TV speakers alone.

Figure 5:
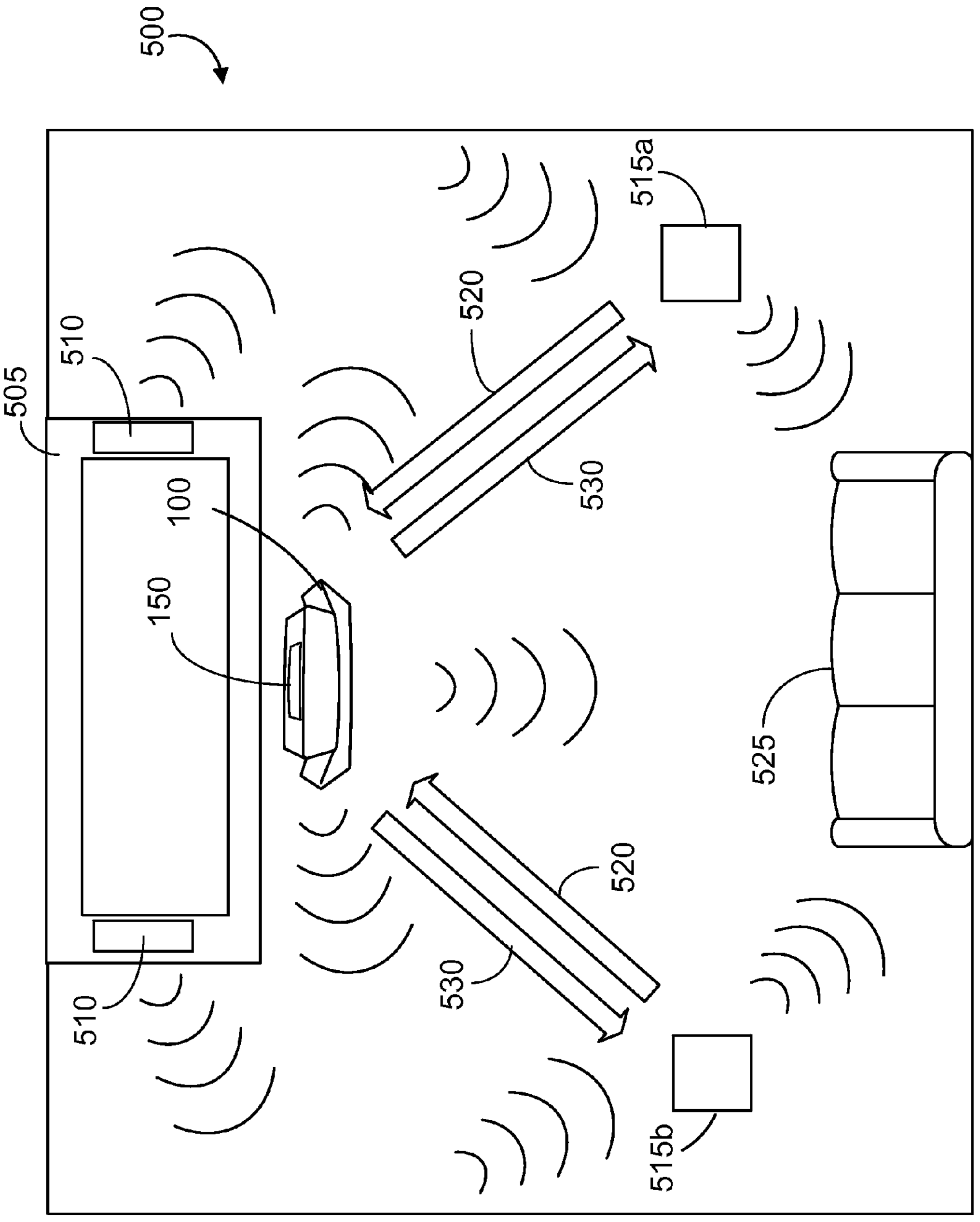
FIG. 5 illustrates an environment where an existing acoustic profile is augmented using technology described herein.

FIG. 5 shows an example environment 500 where an existing acoustic profile of a TV 505 is augmented using an acoustic device 100 and multiple speakers associated with the acoustic device 100. For example, the TV includes speakers 510 which radiate sound from the TV within the environment 500 (e.g., a room), which is then measured at the location of one or more speakers disposed within the environment 500. The measurements made at the locations of the one or more speakers can be provided as a feedback signal to the acoustic device 100, which then determines and provides control signals to the one or more speakers to achieve a target acoustic distribution within the environment 500.

The one or more speakers can include the speakers 104 disposed either a part of the acoustic device 100 (as shown in FIG. 1A), or detached from the acoustic device 100 (as shown in FIG. 1C). In some implementations, the one or more speakers can include additional speakers 515*a*, 515*b*, etc. (515, in general) connected to the acoustic device 100 via wired or wireless connections. For example, the one or more additional speakers 515 may be connected to the acoustic device over a Bluetooth® connection. In some implementations, at least one of the speakers can include a recording device (e.g., a microphone) that records sounds reaching the location at which the speaker is disposed. A feedback signal 520 based on the recordings can then be transmitted back to the acoustic device 100. Based on the one or more feedback signals 520, the processing circuitry within the acoustic device 100 can be configured to determine an overall acoustic distribution within the environment 500. In this document, an acoustic distribution is also referred to as an acoustic profile.

Based on information regarding an existing acoustic distribution, the acoustic device 100 can be configured to determine how the acoustic output from one or more of the connected speakers need to be changed in order to achieve a target acoustic distribution within the environment 500. In some implementations, the target acoustic distribution can be defined as a distribution of acoustic energy at a target location 525 (e.g., a sofa, a set of chairs, or another location where the users are likely to be present while watching the TV 505) disposed in the environment 500.

In some implementations, the target acoustic distribution can specify how the acoustic energy for various frequency ranges are expected to reach the target location 525. In the example of FIG. 5, the target acoustic distribution for the location 525 can specify that the dialog components (i.e., mid-range frequencies) of the audio are to be provided primarily by the portable speaker 150, while the high and low frequencies are to be provided primarily by the speakers 515 and the speakers 104 (FIGS. 1A-1C) in the acoustic device 100, respectively. The target acoustic distribution may also specify the gain level at which the acoustic energy from each speaker is expected to reach the target location 525. The gain level can be specified, for example, in terms of relative gain with respect to the overall gain level defined by a volume setting.

In some implementations, the acoustic device can be configured to send one or more control signals 530 to the speakers within the environment 500, such that the control signals 530 cause changes in the acoustic outputs from the corresponding speakers. The changes caused by the control signals 530 can be such that the resultant acoustic distribution is closer to the target acoustic distribution as compared to the acoustic distribution before the change. In some implementations, the control signals 530 can be configured to carry information that causes a change in the coefficients of an adaptive filter disposed in the corresponding speaker. In some implementations, the control signals can carry information that causes a change in a gain level of acoustic energy radiated from the corresponding speaker. For example, if the acoustic device 100 determines, based on the feedback signals 520, that the gain level of the speaker 515*a* is less than what is needed to obtain the target acoustic distribution for the given overall volume setting, the acoustic device 100 can be configured to transmit a control signal 530 to the speaker 515*a*. The control signal 530 then causes the processing circuitry of the speaker 515*a* to adjust the gain of the speaker accordingly. In some implementations, the control signals 530 can be configured to facilitate acoustic beamforming as described above with reference to FIGS. 1A-1C.

The acoustic device 100 therefore allows for augmenting existing acoustic profiles to provide an improved acoustic experience, thereby providing a relatively low cost alternative to more expensive home-theater systems. In some implementations, the technology can be made scalable, thereby allowing a user to add additional speakers to improve the acoustic experience.

Figure 6:
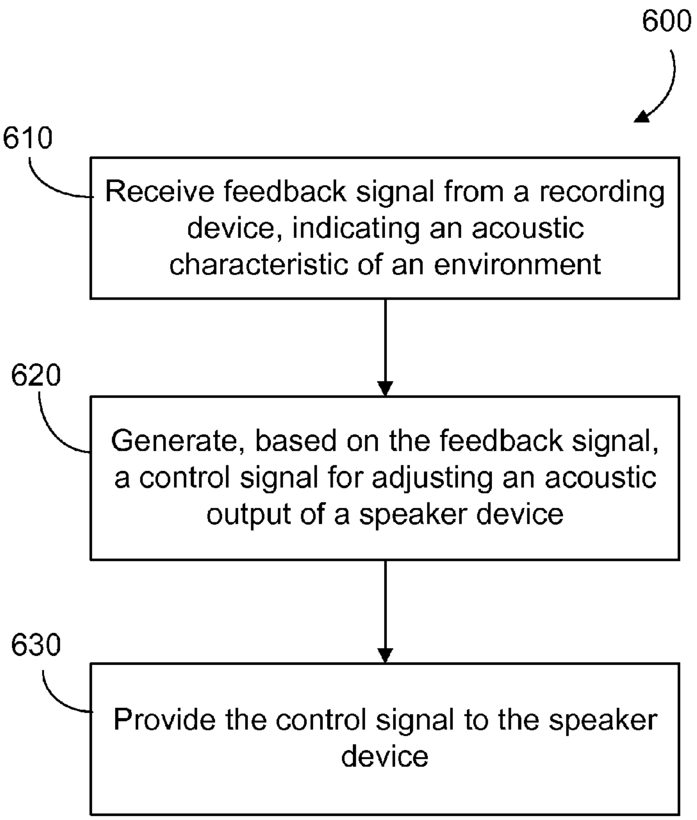
FIG. 6 is a flowchart of an example process for controlling a speaker device to augment an existing acoustic profile.

FIG. 6 illustrates a flowchart of an example process 600 for controlling a speaker device to augment an existing acoustic profile. At least a portion of the process 600 can be performed by the acoustic device 100 using, for example, the processing circuitry 320 (FIG. 3). Operations of the process 600 includes receiving a feedback that indicates an acoustic characteristics of an environment (610). The acoustic characteristics of the environment can be measured, for example, using a microphone disposed at a location within the environment. The location can be within a target location for which a target acoustic profile or distribution is specified. In some implementations, the microphone can be disposed on a speaker within the environment. In some implementations, the microphone measures an acoustic output from one or more TV speakers, or speakers of another media device such as a CD player.

The operations further include generating, based on the feedback signal, a control signal for adjusting an acoustic output of a speaker device to achieve a target acoustic distribution within the environment (620). The control signal can be generated, for example, as described above with respect to FIG. 5. In some implementations, the control signal includes information that causes changes in acoustic outputs from one or more speaker devices. For example, the control signal can include coefficients of an adaptive filter that controls the acoustic output of one or more speakers in the environment. In some implementations, the control signals are generated upon verifying that the received feedback signal substantially matches an expected template signal. This can be done, for example, to verify that the acoustic signal recorded by the microphone is indeed due to the acoustic output of one or more speakers (e.g., the TV speakers) in the environment. In some implementations, the verification can be done by determining a similarity measure between the feedback signal and the expected template signal, and determining that the similarity measure satisfies a threshold condition.

Operations of the process further includes providing the control signal to the speaker device (630). The control signal can be provided to the speaker device over a wired or wireless connection. For example, if a portable speaker is docked on the acoustic device 100, the control signal can be provided to the portable speaker over a connection similar to the electrical terminal 106 described above with reference to FIG. 1A. In another example, the control signal can be provided to the speaker device over a wireless connection such as a Bluetooth® connection.

Figure 7:
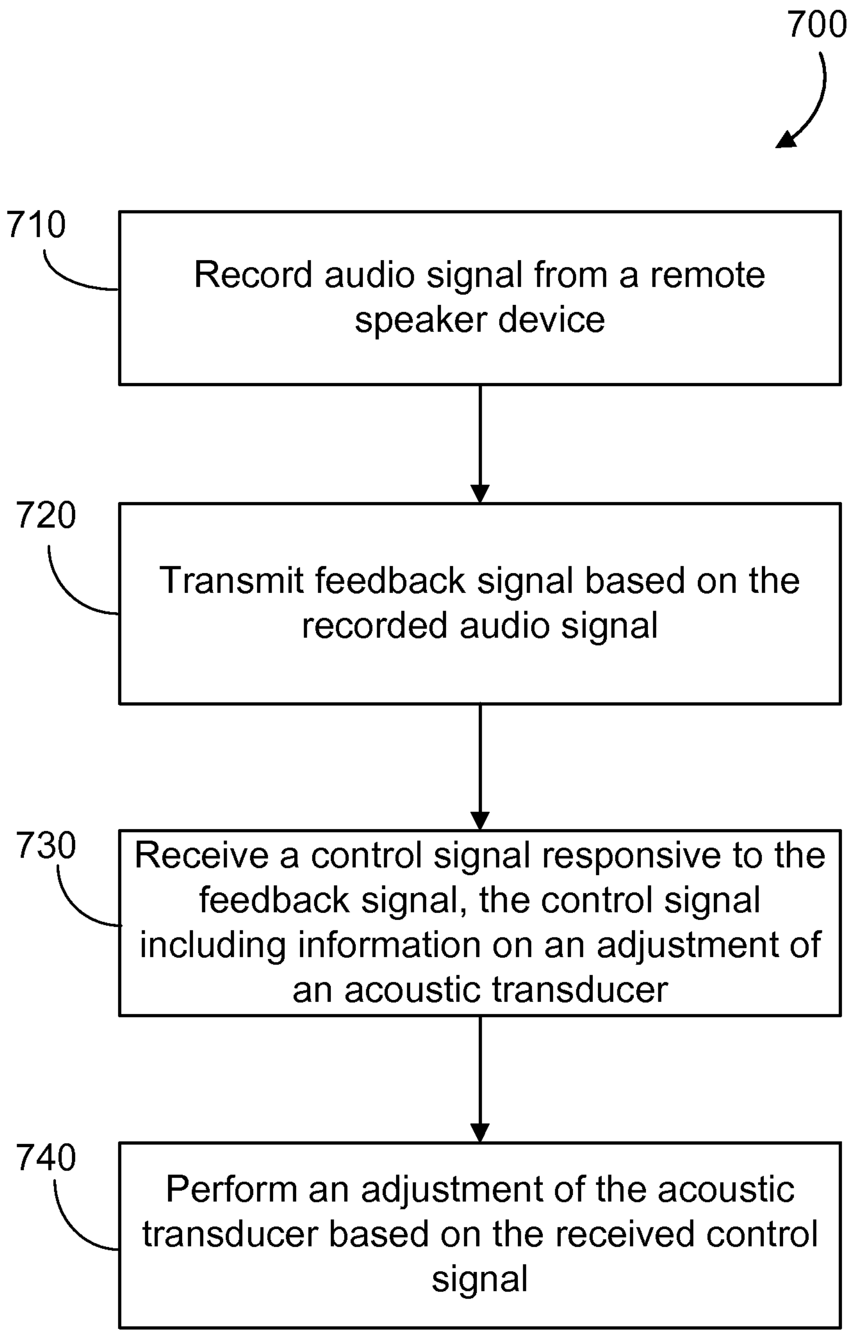
FIG. 7 is a flowchart of an example process for providing a feedback signal from the speaker device and receiving a control signal based on the feedback.

FIG. 7 shows a flowchart of an example process 700 for providing a feedback signal from the speaker device and receiving a control signal based on the feedback. At least a portion of the operations of the process 700 can be performed by processing circuitry (e.g., circuitry including one or more of a microprocessor, microcontroller, DSP, memory and wireless transceiver) disposed in a speaker device. Operations of the process includes recording audio signal from a remote speaker device (710). The remote speaker device can include a TV speaker, or a speaker associated with another media device such as a CD player. The recording can be done, for example, a microphone disposed on the speaker device, or at another location at the target location for which a target acoustic distribution has been specified.

The operations also include transmitting a feedback signal based on the audio signal recorded using the recording device (720). The feedback signal can be substantially similar to the feedback signal 520 described above with reference to FIG. 5. In some implementations, the feedback signal is transmitted using a wireless transceiver disposed in the speaker device. In some implementations, the feedback signal can also be transmitted by a wireless transceiver or transmitter disposed in the recording device.

The operations also include receiving a control signal responsive to the feedback signal, wherein the control signal includes information on an adjustment of an acoustic transducer (730). In some implementations, the control signal can be received via a wireless transceiver. The control signal can be substantially similar to the control signals 530 described above with reference to FIG. 5. For example, the control signal can include information on filter coefficients of an adaptive filter that controls the acoustic output of the acoustic transducer. In some implementations, the control signal can also include gain control information for the acoustic transducer.

The operations further include performing an adjustment of the acoustic transducer based on the received control signal (740). This can be done, for example, by a portion of the processing circuitry controlling the acoustic transducer. For example, the adjustment can include updating an adaptive filter implemented using a DSP based on coefficient information included in the control signal. In such a case, the processing circuitry can be configured to obtain a new version of the adaptive filter using the coefficient information and transitioning an audio stream from the previous version of the adaptive filter to the new version of the adaptive filter. Various transitioning techniques including, for example, cross-fading can be used in transitioning the audio stream from the previous version to the new version of the adaptive filter.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a DSP, a microcontroller, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed one or more processing devices at one site or distributed across multiple sites and interconnected by a network.

Actions associated with implementing all or part of the functions can be performed by one or more programmable processors or processing devices executing one or more computer programs to perform the functions of the processes described herein. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

A number of implementations have been described. However, other embodiments not specifically described in details are also within the scope of the following claims. For example, an optical cable may be used for connecting the acoustic device 100 to the media device. When an HDMI cable is used for the connection, the multi-channel capability of the HDMI connection can be used for additional acoustic enhancements such as dialog boosting and increasing spaciousness of sound. When a Bluetooth® connection is used for connecting a speaker to the acoustic device 100, the available backchannel can be used for providing a feedback on a volume of the acoustic device to the speaker. Bluetooth® pairing between the acoustic device and speakers can be made substantially automatic.

In some implementations, equalization parameters of the output signal from the acoustic device can be made adaptive to different docking modes. For example, in one mode, the portable speaker can be docked on the acoustic device 100 and the acoustic device can be connected to the media device. In such a mode, the media device (e.g., a TV) may output preprocessed two channel audio signal. In such cases, the equalization parameters can be adjusted, for example, to correct the audio signal from the TV and make the signal suitable for home theater like acoustic output. In another example where the portable speaker is not docked on the acoustic device 100, the equalization parameters can be adjusted for a dialog mode in which dialogs are boosted for the acoustic output from the portable speaker. The equalization parameters can also be adjusted for a do-not-disturb mode where the dock output levels are reduced. In another example, the acoustic device 100 can be connected to the TV via a HDMI cable, and audio signal from the TV set can be used to enhance dialog and surround effects performance by utilizing multiple channels of audio data. In the example of another mode where the system is receiving Bluetooth® audio signals from a phone or another Bluetooth® device, the equalization parameters can be adjusted, for example, according to a music-specific curve to account for the compressed nature of the content.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein. While this invention has been particularly shown and described with references to preferred embodiments thereof, it will be understood by those skilled in the art that various changes in form and details may be made therein without departing from the spirit and scope of the invention, as defined by the appended claims.

What is claimed is:

1. A first acoustic device comprising:

an input port configured to receive an input signal representing audio from a media device;

one or more acoustic transducers;

a receptacle configured to detachably engage a second acoustic device for charging a battery of the second acoustic device;

one or more processors configured to:

generate, from the input signal, a first signal for producing an acoustic output from the one or more transducers, and a second signal for producing an acoustic output from the second acoustic device, wherein the first and second signals are generated from the input signal based on a feedback signal received from the second acoustic device, the feedback signal including information indicative of a distance of the second acoustic device from the first acoustic device, determine that the distance of the second acoustic device from the first acoustic device satisfies a threshold condition, responsive to determining that the distance of the second acoustic device from the first acoustic device satisfies a threshold condition, adjust the first and second signals such that the acoustic output from the second acoustic device is adjusted in accordance with the acoustic output from the one or more transducers; and an output port for providing a portion of the second signal to the second acoustic device.

2. The first acoustic device of claim 1, wherein the media device is a television.

3. The first acoustic device of claim 1, wherein the input port comprises a receptacle for detachably engaging a wire from the media device.

4. The first acoustic device of claim 1, wherein the input port is configured to receive a wireless signal as the input signal.

5. The first acoustic device of claim 1 comprising multiple transducers.

6. The first acoustic device of claim 5, wherein the first signal is configured to produce acoustic outputs from the multiple transducers.

7. The first acoustic device of claim 1, wherein the second signal is configured to produce acoustic outputs from multiple speaker devices.

8. The first acoustic device of claim 7, wherein the acoustic output from one of the multiple speaker devices is different from the acoustic output from another of the multiple speaker devices.

9. The first acoustic device of claim 1, wherein the output port comprises a transmitter for transmitting the second signal to the second acoustic device.

10. The first acoustic device of claim 9, wherein the transmitter is configured to transmit the second signal in accordance with a Bluetooth® standard.

11. The first acoustic device of claim 1, wherein the feedback signal comprises information on a relative position of the second acoustic device with respect to the first acoustic device.

12. The first acoustic device of claim 1, wherein the one or more processors are configured to use beamforming techniques in generating the first and second signals.

13. A method comprising:

receiving, at a first speaker device that includes one or more processing devices, an input signal representing audio from a media device;

receiving, at the first speaker device, a feedback signal from a second speaker device, the feedback signal comprising information indicative of a distance of the second speaker device with respect to the first speaker device;

processing the input signal based on the information from the feedback signal to generate an output signal configured to produce an acoustic output from the second speaker device, wherein processing the input signal comprises:

determining that the distance of the second speaker device from the first speaker device satisfies a threshold condition, and responsive to determining that the distance of the second speaker device from the first speaker device satisfies a threshold condition, adjusting the output signal such that the acoustic output from the second acoustic device is adjusted in accordance with the acoustic output from the first speaker device; and providing the output signal to the second speaker device.

14. The method of claim 13, wherein the feedback signal further comprises information on a user preference associated with an acoustic output of the second speaker device.

15. The method of claim 14 further comprising generating the output signal also based on the user preference.

16. The method of claim 14, wherein the user preference indicates an acoustic intelligibility of the user.

17. A system comprising:

a speaker device; and a docking device configured to detachably engage with the speaker device, the docking device comprising:

a charging connector configured to provide an electrical connection with a charging port of the speaker device, an input port configured to receive an input signal representing audio from a media device, one or more transducers configured to produce acoustic output, one or more processors configured to:

generate, from the input signal, a first signal for producing an acoustic output from the one or more transducers, and a second signal for producing an acoustic output from the speaker device, wherein the second signal is generated based on a feedback signal from the speaker device, the feedback signal including information indicative of a distance between the speaker device and the docking device responsive to determining that the distance of the speaker device from the docking device satisfies a threshold condition, adjust the first and second signals such that the acoustic output from the speaker device is adjusted in accordance with the acoustic output from the one or more transducers, and an output connector for providing the second signal to the speaker device.

18. The system of claim 17, wherein the one or more processors are configured to use beamforming techniques in generating the first and second signals.

19. The first acoustic device of claim 1, wherein the one or more processors are configured to extract the information indicative of the distance of the second acoustic device from the first acoustic device based on a power of the feedback signal received at the first acoustic device.

20. The first acoustic device of claim 1, wherein a modulated infra-red (IR) radiation signal includes the feedback signal, and the one or more processors are configured to extract the information indicative of the distance of the second acoustic device from the first acoustic device based on analyzing one or more characteristics of the IR radiation.

21. The first acoustic device of claim 1, wherein determining that the distance of the second acoustic device from the first acoustic device satisfies the threshold condition comprises determining that the distance of the second acoustic device from the first acoustic device is larger than a predetermined distance.

22. The first acoustic device of claim 21, wherein the first and second signals are adjusted such that the acoustic output from the second acoustic device is substantially same as the acoustic output from the first acoustic device.

* * * * *